(12) United States Patent
Seo et al.

(10) Patent No.: US 9,714,063 B2
(45) Date of Patent: Jul. 25, 2017

(54) SADDLE-RIDE TYPE VEHICLE

(71) Applicant: HONDA MOTOR CO., LTD., Tokyo (JP)

(72) Inventors: Satoshi Seo, Wako (JP); Gen Tanabe, Wako (JP); Akihiro Komatsu, Wako (JP); Takefumi Okubo, Wako (JP); Masao Akieda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/941,061

(22) Filed: Nov. 13, 2015

(65) Prior Publication Data
US 2016/0229475 A1    Aug. 11, 2016

(30) Foreign Application Priority Data
Sep. 30, 2014    (JP) .................. 2014-202108

(51) Int. Cl.
*B62J 17/00* (2006.01)
*B62J 17/02* (2006.01)
*B62J 17/04* (2006.01)

(52) U.S. Cl.
CPC .............. *B62J 17/02* (2013.01); *B62J 17/04* (2013.01)

(58) Field of Classification Search
CPC .................. B62J 17/02; B62J 17/04

USPC ......................................... 296/78.1
See application file for complete search history.

(56) References Cited

U.S. PATENT DOCUMENTS 4,911,494 A * 3/1990 Imai .................. B62J 17/00
                                              296/180.1

FOREIGN PATENT DOCUMENTS

JP        4153174 B    10/2002

* cited by examiner

*Primary Examiner* — Joseph D Pape
(74) *Attorney, Agent, or Firm* — Birch, Stewart, Kolasch & Birch, LLP

(57) ABSTRACT

A saddle-ride type vehicle includes a front cowl capable of improving appearance quality while suppressing enlargement of the front cowl. Recessed parts recessed rearwardly of a vehicle are formed in front cowls in positions outwardly of front members in a vehicle width direction. The introduction port is formed in the recessed part. The recessed parts are recessed rearwardly of the vehicle beyond tangents brought into contact with the front members and the front cowls. Since guide walls are arranged within a range viewed from introduction ports in a front view, such a possibility that wiring or the like in a front cowl is viewed through the introduction ports in the front view is precluded Immediately behind the introduction ports, air is guided in a desired direction by the guide walls. For this reason, a limited amount of air can be effectively utilized.

19 Claims, 6 Drawing Sheets

SADDLE-RIDE TYPE VEHICLE

CROSS-REFERENCE TO RELATED APPLICATIONS

The present application claims priority under 35 USC 119 to Japanese Patent Application No. 2014-202108 filed Sep. 30, 2014 the entire contents of which are hereby incorporated by reference.

BACKGROUND OF THE INVENTION

1. Field of the Invention

The present invention relates to a saddle-ride type vehicle configured in such a manner that a front part is surrounded by a front cowl and the front cowl is formed with an introduction port.

2. Description of Background Art

There is a saddle-ride type vehicle with a vehicle body covered with a cowl. The operational performance can be improved by achieving a smooth flow of air by the cowl. The cowl for covering a front part of the vehicle body is called a front cowl. Various kinds of shapes and structures of the front cowl have been proposed. See, for example, JP Patent No. 4153174 (FIG. 1 and FIG. 15).

A vehicle (10) (a number in parentheses is indicative of a reference number described in JP Patent No. 4153174. The same shall apply hereafter.) is shown in FIG. 1 of JP Patent No. 4153174 that is provided with a front cowl (21). The front cowl (21) has an air introduction port (32a) formed in an upper part of the center, and also has air introduction ports (21a) formed on right and left sides of a lower part.

As shown in FIG. 15 of JP Patent No. 4153174, air (Fw) led to flow into from the air introduction port (32a) and the air introduction ports (21a) is discharged from an air discharge port (92), is led to flow along a back surface of a windshield (31) as shown by an arrow (Rw), and also is discharged from an air discharge port (99). Vacuum of the back surface of the windshield (31) can be corrected by a flow shown by the arrow (Rw).

If the air introduction ports (21a) are simple holes, the air led to flow into from the air introduction ports (21a) is released into a large space in the front cowl (21), so that flow velocity is reduced. As a result, the flow velocity of the air discharged from the air discharge port (92) and the air discharge port (99) is reduced. The reduced flow velocity results in insufficient correction action with respect to the vacuum. In addition, entrainment of the air from an outer side of the front cowl (21) to the back surface of the front cowl (21) cannot be suppressed.

As a countermeasure, if the opening area of each of the air introduction ports (21a) is increased, this causes enlargement of the front cowl. Also, if the air introduction holes (21a) are the simple holes, wiring and the like in the front cowl are viewed through the air introduction holes (21a) having a large diameter. Therefore, an improvement in external appearance is required.

A saddle-ride type vehicle is required that includes a front cowl that is capable of improving the appearance quality while suppressing the enlargement of the front cowl.

SUMMARY AND OBJECTS OF THE INVENTION

An object of an embodiment of the present invention is to provide a saddle-ride type vehicle including a front cowl capable of improving the appearance quality while suppressing the enlargement of the front cowl.

According to an embodiment of the present invention, there is provided a saddle-ride type vehicle including a vehicle body frame that has a head pipe; a front wheel suspension that is arranged below the head pipe; a handlebar that is arranged above the head pipe and that steers the front wheel suspension; and a front cowl that is supported on the vehicle body frame and that covers an upper part of the front wheel suspension and the handlebar from a front side of the vehicle. In the saddle-ride type vehicle, the front cowl is provided with an introduction port that is arranged below the handlebar, that is opened to the outside in a vehicle width direction of the front wheel suspension and that introduces air, and is also provided with a guide wall that is arranged behind the introduction port, that is inclined upward to a rear side and inward, that is arranged within a range viewed from the introduction port in a front view, and that guides the air.

According to an embodiment of the present invention, the front cowl is configured in such a manner that a middle member is joined in front of a front member, a headlight is arranged forward of the front wheel suspension, the headlight is surrounded by a headlight cowl part of the front member, the middle member is formed with a recessed part recessed rearwardly of the vehicle in a position outward of the headlight cowl part in the vehicle width direction, the recessed part is recessed rearwardly with respect to a tangent brought into contact with the headlight cowl part and an outer side of the recessed part formed in the middle member, and the introduction port is formed in the recessed part.

According to an embodiment of the present invention, the front member is formed with an air introduction passage part linked to a rear side of the introduction port.

According to an embodiment of the present invention, the front member is formed with the air introduction passage part linked to the rear side of the introduction port, the air introduction passage part being connected to the guide wall. An inner cowl is annexed to the front cowl from a side of the center of a vehicle body in order to form an intake passage space with respect to an engine, the inner cowl being formed integrally with the guide wall.

According to an embodiment of the present invention, a steering space for allowing steering of the front wheel suspension is formed in the inner cowl while surrounding the head pipe by an inner surface of the inner cowl, the air from the introduction port is introduced into the steering space along the guide wall, and the introduced air is introduced to a rear side of a windshield arranged above the front cowl and to a front side of the handlebar.

According to an embodiment of the present invention, the front cowl is provided with the introduction port that is arranged below the handlebar, that is opened to the outside in the vehicle width direction of the front wheel suspension and that introduces air, and the introduced air is guided by the guide wall. Since the guide wall is inclined upward to the rear side and inward, the air can be moved upward toward the back surface of the front cowl. When a vacuum is generated with respect to the back surface of the front cowl, the vacuum can be controlled by the air. When the windshield is annexed above the front cowl, the vacuum of the back surface of the windshield can be also controlled.

Further, since the guide wall is arranged within the range viewed from the introduction port in the front view of the vehicle, such a possibility that the wiring or the like in the front cowl is viewed through the introduction port is precluded. Since the air is guided in a desired direction by the guide wall just behind the introduction port, the high-flowvelocity air is introduced upwardly, and entrainment of the air from the outer side of the front cowl to the back surface thereof is suppressed, so that a limited amount of air can be effectively utilized. As a result, the necessity to increase the opening area of the introduction port is eliminated.

Now therefore, the present invention can provide the saddle-ride type vehicle including the front cowl capable of improving the appearance quality while suppressing the enlargement of the front cowl.

According to an embodiment of the present invention, the front cowl is provided with the recessed part recessed rearward of the vehicle. The recessed part is recessed rearwardly of the vehicle with respect to the tangent brought into contact with the front member and the front cowl. The introduction port is formed in the recessed part formed as described above. Thereby, when the vehicle is banked during turning, even if a bank angle is changed, resistance caused by the air flowing along the front surface of the front cowl can be substantially kept constant. As a result, the operational performance can be excellently maintained.

According to an embodiment of the present invention, the headlight cowl part and the air introduction passage part are formed integrally with each other. According to an embodiment of the invention, the positioning accuracy of the air introduction passage part with respect to the headlight cowl part can be improved. In addition, the number of components can be reduced.

According to an embodiment of the present invention, since the guide wall is formed integrally with the inner cowl forming the intake passage space, the number of components can be reduced.

According to an embodiment of the present invention, the steering space is formed by the inner cowl, and the air is introduced to the windshield located above the front cowl by using the steering space. Introduction of the air flowing outside in the vehicle width direction of the front cowl and the windshield, to the inner side in the vehicle width direction by the vacuum generated behind the front cowl and behind the windshield, can be suppressed by air introduction flowing outside of a front fork in the steering space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment according to the present invention will be described below based on accompanying drawings. Note that drawings are viewed from directions shown by reference signs.

Figure 1:
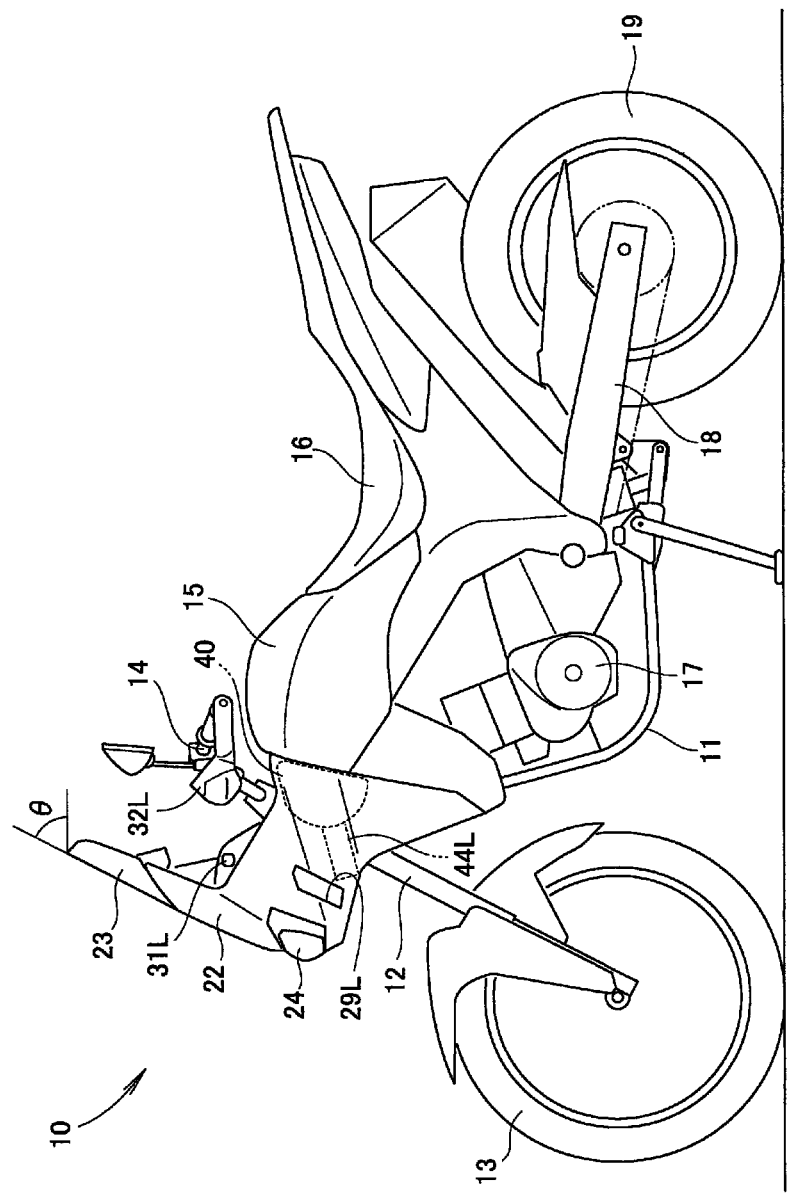
FIG. 1 is a left side view of a saddle-ride type vehicle.

As shown in FIG. 1, a saddle-ride type vehicle 10 includes front wheel suspensions 12 steerably mounted in front of a vehicle body frame 11, a front wheel 13 rotatably attached to lower parts of the front wheel suspensions 12, a steering handlebar 14 mounted to upper parts of the front wheel suspensions 12, a fuel tank 15 arranged below the handlebar 14 and supported on the vehicle body frame 11, a seat 16 arranged behind the fuel tank 15, an engine 17 arranged below the fuel tank 15 and supported on the vehicle body frame 11. A swing arm 18 extends rearwardly from the vehicle body frame 11 with a rear wheel 19 rotatably attached to the swing arm 18. Front cowls 22 are arranged in front of the fuel tank 15 so as to surround the front wheel suspensions 12 with a windshield 23 mounted above the front cowls 22, and headlights 24 mounted to the front parts of the front cowls 22. The saddle-ride type vehicle 10 is a vehicle configured such that an upper part of a rider's body is kept up while striding over the seat 16.

The windshield 23 is obliquely mounted so that in a side view of the vehicle, an upper part of the windshield is positioned rearwardly of the vehicle with respect to a lower part of the windshield. A mounting angle $\theta$ with respect to a horizontal line is set within a range of 45° to 80°.

Since the mounting angle $\theta$ is set to 45° or larger, the windbreak performance can be improved while achieving a reduction in weight of the windshield 23 by shortening a longitudinal length of the windshield 23. Also, since the mounting angle $\theta$ is set to 80° or smaller, the flow of air is suppressed from being excessively stemmed by the windshield 23. Therefore, the mounting angle $\theta$ is set to 45° to 80°, and more preferably set to about 60°.

Since the windshield 23 is mounted upright, a predetermined windbreak action can be exerted even by the compact windshield. Since the windshield is compact, a reduction in the weight of the windshield can be achieved.

Figure 2:
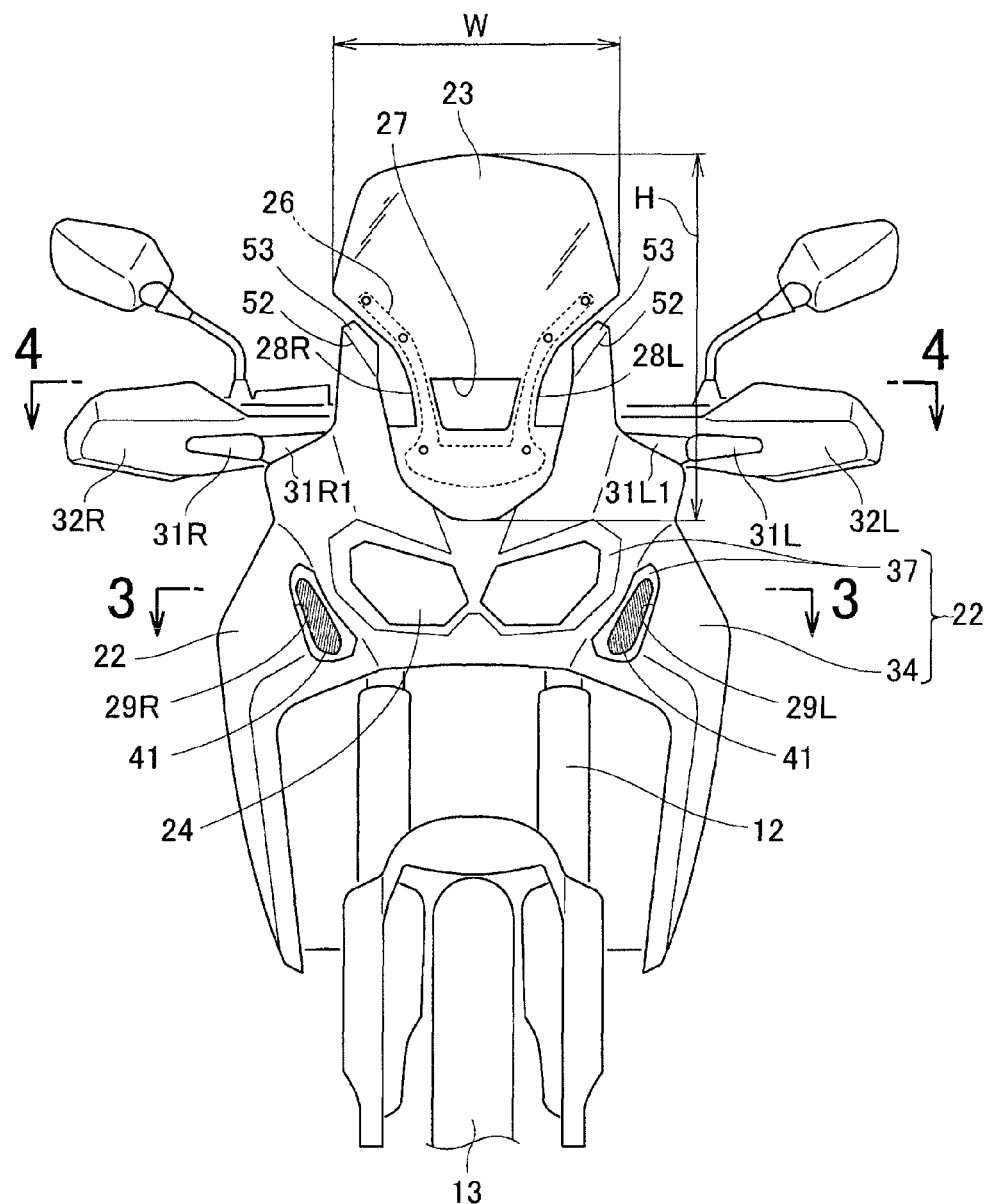
FIG. 2 is a front view of the saddle-ride type vehicle.

As shown in FIG. 2, the windshield 23 is arranged above the front cowls 22. The windshield 23 is supported by a windshield stay 26. The windshield 23 is formed as a vertically long windshield with a vertical dimension H being larger than a dimension W in the vehicle width direction with an opening 27 being formed below the center in a height direction of the vertically long windshield and penetrating through a front part and a rear part of the vehicle (a front direction and a rear direction in the drawing). Further, the windshield 23 has right and left notches 28R, 28L (a reference sign R is indicative of a suffix showing the right, and a reference sign L is indicative of a suffix showing the left. The same shall apply hereafter.) formed on the right side and the left side of the opening 27 so that a lower part of the windshield is recessed inwardly in the vehicle width direction with respect to the center in the height direction.

The front cowls 22 are provided with the headlights 24 in the center in the vehicle width direction. Introduction ports 29R, 29L composed of openings opened forward are provided respectively on a right side and a left side of the headlights 24. Right and left turn signal lamps 31R, 31L and strut parts 31R1, 31L1 for supporting the turn signal lamps 31R, 31L are provided above the headlights 24.

In the front view of the vehicle, the turn signal lamps 31R, 31L or the strut parts 31R1, 31L1 overlap with knuckle guards 32R, 32L located behind the turn signal lamps 31R, 31L or the strut parts 31R1, 31L1.

As shown in FIG. 1, the introduction ports 29R, 29L are arranged below the handlebar 14, and as shown in FIG. 2, the introduction ports 29R, 29L are arranged outside in the vehicle width direction of the front wheel suspensions 12.

Figure 3:
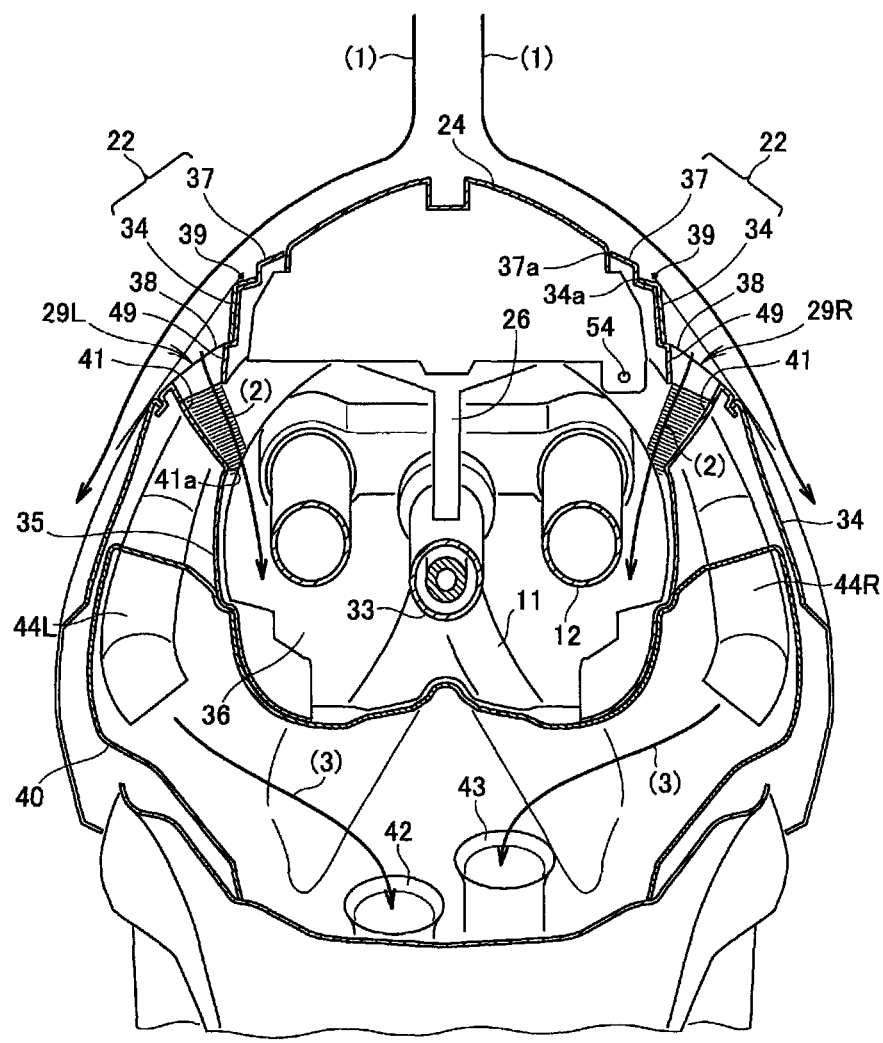
FIG. 3 is a cross-sectional view taken along line 3-3 in FIG. 2.

As shown in FIG. 3, the front cowls 22 are configured in such a manner that middle members 34 are joined to front sides of front members 37. The front members 37 are formed with air introduction passage parts 49, 49 extending to be continuous with rear sides of the introduction ports 29R, 29L formed in the middle members 34.

The windshield stay 26 extends forward of the vehicle from the head pipe 33 provided to a front part of the vehicle body frame 11. In addition, the front wheel suspensions 12 are steerably mounted to the head pipe 33. The inner cowl 35 is arranged inside of the middle members 34. The inner cowl 35 forms a steering space 36 for allowing steering of the front wheel suspensions 12 while surrounding the head pipe 33 and the front wheel suspensions 12.

The headlights 24 are provided with LED light sources, and are exposed forward from headlight cowl parts 37a provided with headlight openings formed in the front members 37. Openings 34a are formed in the middle members 34 along the peripheries of the headlight cowl parts 37a of the front members 37.

Figure 4:
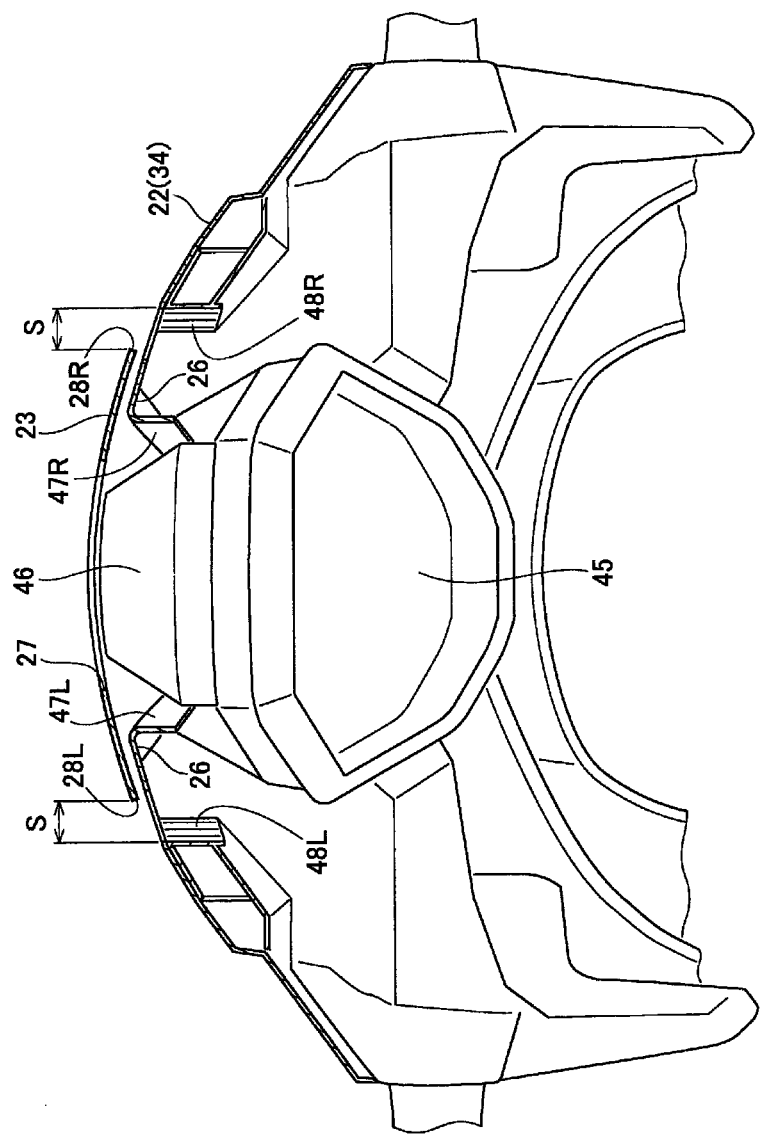
FIG. 4 is a cross-sectional view taken along line 4-4 in FIG. 2.

Also, the front members 37 are formed integrally with a guide member 46 in FIG. 4 arranged on the back surface of the windshield 23.

In positions of the front members 37 on an outer side in the vehicle width direction, recessed parts 38, 38, recessed rearwardly of the vehicle are formed in the middle members 34, and the introduction ports 29R, 29L are formed in the recessed parts 38, 38. The recessed parts 38 are recessed rearwardly of the vehicle with respect to tangents 39 brought into contact with the headlight cowl parts 37a and outer sides in the vehicle width direction of the recessed parts formed in the middle members 34.

During turning, the air flowing along the headlights 24 is led to smoothly flow along the tangents 39 as shown by arrows (1), (1). On the other hand, during straight-ahead traveling, the flow of air from the front side of the vehicle is led to flow directly into the introduction ports 29R, 29L as shown by arrows (2), (2).

Since the recessed parts 38, 38 are formed, the air is led to flow as shown by the arrows (1), (1) during turning. Therefore, even if a bank angle is changed when the vehicle is banked during turning, resistance caused by the air flowing along the front surface of the front cowl can be substantially kept constant. As a result, operating performance can be excellently maintained.

In the embodiment, guide walls 41, 41 inclined inwardly and upwardly are connected to the introduction ports 29R, 29L. The air can be led to flow upwardly and to the center of the vehicle body by the guide walls 41, 41. The guide walls 41, 41 configured in this way are formed integrally with the inner cowl 35.

An inner end 41a of the guide wall 41 extends to the same extent as an edge 29a inside in the vehicle width direction of the introduction port 29L or to a side of the center of the vehicle body. As a result, in FIG. 2, the guide walls 41, 41 are brought into view from the introduction ports 29R, 29L. More specifically, since the inside (wiring or an air intake duct 44 exists in the inside) is not brought into view through the introduction ports 29R, 29L, the quality of the appearance can be improved.

In FIG. 3, an air cleaner case 40 is arranged behind the head pipe 33 in the vehicle, and inlet ports 42, 43 for the engine 17 are arranged in the air cleaner case 40. Air intake ducts 44R, 44L are arranged between the inner cowl 35 and the middle members 34 of the front cowls 22, and some of the air is introduced from below the front cowls 22 into the air cleaner case 40 through the air intake ducts 44R, 44L and is introduced to the inlet ports 42, 43 as shown by arrows (3), (3).

Also, the flow of air, as shown by the arrows (2), (2), reaches the steering space 36. The steering space 36 is configured such that at least an upper surface thereof is opened, and the air (as shown by the arrows (2), (2)) is led to flow upwardly (to a front side in the drawing) behind the front cowls 22 and in front of an occupant. More specifically, the air (as shown by the arrows (2), (2)) is led to flow upwardly behind the front cowls 22 and in front of the fuel tank 15, that is, in front of the handlebar 14.

Introduction of the air flowing outside in the vehicle width direction of the front cowls and the windshield, to the inner side in the vehicle width direction by the vacuum generated behind the front cowls and behind the windshield, can be suppressed by the air introduction flowing outside of a front fork in the steering space.

Note that the intake ducts 44R, 44L are allowed to be eliminated and an intake passage for introducing intake air for the engine is allowed to be provided or formed between the inner cowl 35 and the middle members 34. In addition, an outside temperature sensor 54 is supported behind the headlights 24, and the temperature of the air flowing through the air introduction passage parts is measured. Thereby, since fresh air is normally introduced, the temperature sensing accuracy of the outside air temperature can be improved.

As shown in FIG. 4, the opening 27 is formed in the windshield 23 with the guide member 46 rising obliquely upwardly to the rear side of the vehicle being provided in a position rearwardly of the opening 27 in the vehicle. In this example, a meter case 45 is arranged behind the opening 27 in the vehicle, and an upper end of the guide member 46 is placed on or connected to a front edge of the meter case 45.

A member having an L-shaped cross-sectional surface is employed for the windshield stay 26 for supporting the windshield 23. The windshield stay 26 has one surface being parallel to the windshield 23 and the other surfaces extending in the longitudinal direction of the vehicle. More specifically, the other surfaces are side guide surfaces 47R, 47L, and are arranged to sandwich the guide member 46.

Predetermined intervals S, S are kept between the notches 28R, 28L formed in the windshield 23 and the middle members 34. Further, the middle members 34 are provided with inner wall guide surfaces 48R, 48L extending rearwardly of the vehicle.

Figure 5:
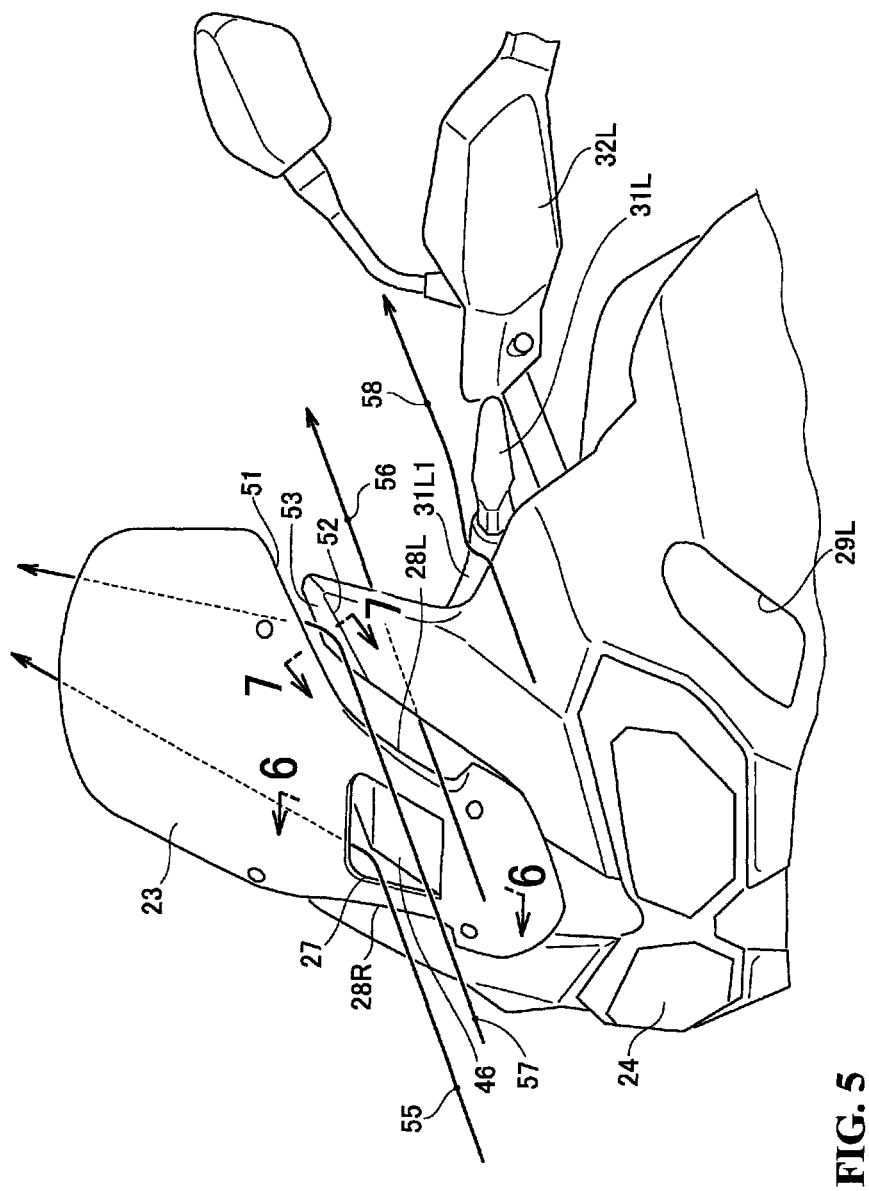
FIG. 5 is a perspective view for explaining an air flow.

As shown in FIG. 5, an upper part of the notch 28L formed in the windshield 23 has an inclined edge 51 inclined so as to be heightened outwardly in the vehicle width direction. In addition, the middle member 34 has an inclined piece 53 in a position behind the inclined edge 51 with the inclined piece being bent rearwardly of the vehicle along a ridge line 52 substantially parallel to the inclined edge 51. The same applies to the notch 28R.

Figure 6:
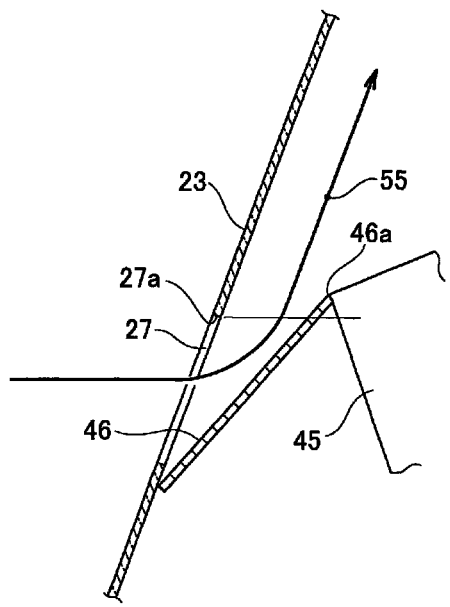
FIG. 6 is a cross-sectional view taken along line 6-6 in FIG. 5.

As shown in FIG. 6, the guide member 46 is provided behind the opening 27, and the first flow of air 55 introduced from the opening 27 is led to flow upwardly along the back surface of the windshield 23. An upper end 46a of the guide member 46 extends upwardly beyond the horizontal line passing through an upper edge 27a of the opening 27, and in the front view of the vehicle, the opening 27 overlaps with the guide member 46. More specifically, the guide member 46 and the opening 27 overlap with each other in the longitudinal direction. Especially, in a height direction of the opening 27, the whole opening overlaps with the guide member 46.

Figure 7:
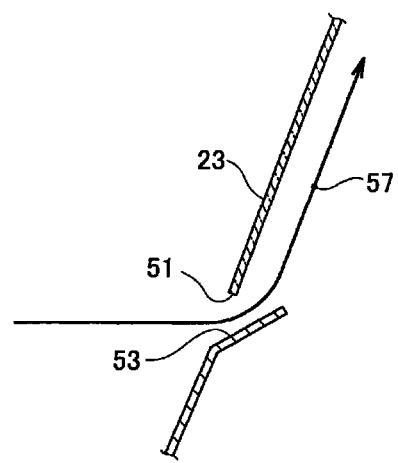
FIG. 7 is a cross-sectional view taken along line 7-7 in FIG. 5.

As shown in FIG. 7, the third flow of air 57 is bent by the inclined piece 53, and is moved upwardly along the back surface of the windshield 23 and toward the center of the vehicle width.

A flow direction of the first flow of air 55 or the like will be detailedly described based on FIG. 5.

The first flow of air 55 as shown in FIG. 5 is passed through the opening 27 formed in the windshield 23. Immediately after that, a direction of the first flow of air 55 is changed by the guide member 46, and is moved upwardly along the back surface of the windshield 23. Thereby, the vacuum of the back surface of the windshield 23 is corrected.

At this time, the right and left side guide surfaces 47R, 47L as shown in FIG. 4 become effective. That is, after the first flow of air 55 is hit against the guide member 46, the first flow of air 55 is suppressed from being dispersed in the vehicle width direction by the side guide surfaces 47R, 47L.

In FIG. 5, the second flow of air 56 is introduced between the notch 28L and the inner wall guide surface 48L as illustrated in FIG. 4. As shown in FIG. 4, since the inner wall guide surfaces 48R, 48L extend rearwardly of the vehicle, the second flow of air 56 is led to flow out to the rear side of the vehicle without entering into behind the windshield 23.

In FIG. 5, the third flow of air 57 is moved upwardly along the back surface of the windshield 23 and toward the center of the vehicle width after the flow of air is bent by the inclined piece 53. The first flow of air 55 with the width limited by the side guide surfaces 47R, 47L shown in FIG. 4 is intended to extend in the vehicle width direction above the windshield stay 26 in FIG. 2, However, in FIG. 5, the extension of the first flow of air 55 is limited by the third flow of air 57 directed to the center of the vehicle width. Therefore, the first flow of air 55 is moved upwardly along the back surface of the windshield 23 while the extension of the first flow of air 55 is limited, so that especially, the vacuum generated in the vicinity of the upper edge of the windshield 23 is corrected.

In FIG. 2, the knuckle guards 32R, 32L are formed to have large frontal area so as to cover the hands gripping the grips.

As shown in FIG. 5, the fourth flow of air 58 first reaches the turn signal lamp 31L or the strut part 31L1, and is dispersed there, and a course of the fourth flow of air is changed to an upward direction. As a result, wind pressure at the knuckle guard 32L is relieved.

Note that in the embodiment, the present invention is applied to a two-wheeled vehicle. However, the present invention is allowed to be applied to the saddle-ride type vehicle provided with three wheels or four wheels.

The present invention is suitable for a two-wheeled vehicle including a front cowl.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A saddle-ride vehicle comprising:
a vehicle body frame including a head pipe;
a front wheel suspension arranged below the head pipe;
a handlebar arranged above the head pipe for steering the front wheel suspension; and
a front cowl supported on the vehicle body frame for covering an upper part of the front wheel suspension and the handlebar from a front side of the vehicle,
wherein the front cowl is provided with:
an introduction port arranged below the handlebar, that is opened to the outside in a vehicle width direction of the front wheel suspension and that introduces a flow of air; and
a guide wall arranged behind the introduction port, and inclined upwardly to a rear side of the vehicle and inwardly in the width direction of the vehicle as viewed from a front view of the vehicle for guiding the flow of air.

2. The saddle-ride vehicle according to claim 1, wherein the front cowl is configured whereby a middle member is joined in front of a front member,
a headlight is arranged forward of the front wheel suspension,
the headlight is surrounded by a headlight cowl part of the front member,
the middle member is formed with a recessed part recessed rearwardly of the vehicle in a position outwardly of the headlight cowl part in the vehicle width direction,
the recessed part is recessed rearwardly with respect to a tangent brought into contact with the headlight cowl part and an outer side of the recessed part formed in the middle member, and
the introduction port is formed in the recessed part.

3. The saddle-ride vehicle according to claim 2, wherein the front member is formed with an air introduction passage part linked to a rear side of the introduction port.

4. The saddle-ride vehicle according to claim 1, wherein a front member is formed with an air introduction passage part linked to a rear side of the introduction port, the air introduction passage part being connected to the guide wall, and
an inner cowl is annexed to the front cowl from a side of the center of a vehicle body in order to form an intake passage space with respect to an engine, the inner cowl being formed integrally with the guide wall.

5. The saddle-ride vehicle according to claim 4, wherein a steering space for allowing steering of the front wheel suspension is formed in the inner cowl while surrounding the head pipe by an inner surface of the inner cowl,
the flow of air from the introduction port is introduced into the steering space along the guide wall, and
the introduced air is introduced to a rear side of a windshield mounted above the front cowl and to a front side of the handlebar.

6. The saddle-ride vehicle according to claim 1, wherein a windshield is mounted on the front cowl, and an opening is formed in the windshield with a guide member rising obliquely upwardly towards a rear side of the vehicle, wherein a meter case is arranged behind the opening with an upper end of the guide member being positioned on a front edge of the meter case.

7. The saddle-ride vehicle according to claim 1, wherein a windshield is mounted on the front cowl with a notch formed in the windshield with an inclined edge inclined in a heightened outward direction of the vehicle for directing a flow of air to a rear surface of the windshield.

8. The saddle-ride vehicle according to claim 7, wherein a first flow of air is directed to the rear surface of the windshield, a second flow of air is directed between the notch and an inner wall guide surface to be directed rearwardly without entering a space to the rear surface of the windshield.

9. The saddle-ride vehicle according to claim 8, wherein a third flow of air is directed to a center portion of the rear surface of the windshield, wherein a vacuum generated in a vicinity of an upper edge of the windshield, is corrected.

10. The saddle-ride vehicle according to claim 1, wherein the flow of air flows along a tangent to the front cowl to provide a smooth flow of air into the introduction port.

11. A saddle-ride vehicle comprising:
a vehicle body frame including a head pipe;
a front cowl supported on the vehicle body frame for covering a front side of the vehicle,
an air introduction port arranged in the front cowl, said introduction port being opened to the outside in a vehicle width direction for introducing a flow of air;
a guide wall arranged behind the introduction port, said guide wall being inclined upwardly to a rear side of the vehicle and inwardly in the width direction of the vehicle for guiding the flow of air, and
a windshield mounted on the front cowl, said windshield provided with an opening;
a guide member is positioned rearwardly of the opening and rises obliquely upward toward the rear side of the vehicle and
a meter case is arranged behind the opening with an upper end of the guide member being positioned on a front edge of the meter case.

12. The saddle-ride vehicle according to claim 11, wherein the front cowl is configured whereby a middle member is joined in front of a front member,
a headlight is arranged in the front cowl,
the headlight is surrounded by a headlight cowl part of the front member,
the middle member is formed with a recessed part recessed rearwardly of the vehicle in a position outwardly of the headlight cowl part in a vehicle width direction,
the recessed part is recessed rearwardly with respect to a tangent brought into contact with the headlight cowl part and an outer side of the recessed part formed in the middle member, and
the introduction port is formed in the recessed part.

13. The saddle-ride vehicle according to claim 12, wherein the front member is formed with an air introduction passage part linked to a rear side of the introduction port.

14. The saddle-ride vehicle according to claim 11, wherein a notch is formed in the windshield with an inclined edge inclined in a heightened outward direction of the vehicle for directing a flow of air to a rear surface of the windshield.

15. The saddle-ride vehicle according to claim 14, wherein a first flow of air is directed to the rear surface of the windshield, a second flow of air is directed between the notch and an inner wall guide surface to be directed rearwardly without entering the space to the rear surface of the windshield.

16. The saddle-ride vehicle according to claim 15, wherein a third flow of air is directed to a center portion of the rear surface of the windshield wherein a vacuum generated in a vicinity of an upper edge of the windshield is corrected.

17. The saddle-ride vehicle according to claim 11, wherein the flow of air flows along a tangent to the front cowl to provide a smooth flow of air into the introduction port.

18. A saddle-ride vehicle comprising:
a vehicle body frame including a head pipe;
a front cowl supported on the vehicle body frame for covering a front side of the vehicle,
an air introduction port arranged in the front cowl, said introduction port being opened to the outside in a vehicle width direction for introducing a flow of air;
a guide wall arranged behind the introduction port, said guide wall being inclined upwardly to a rear side of the vehicle and inwardly in the width direction of the vehicle for guiding the flow of air;
a front member formed with an air introduction passage part linked to a rear side of the introduction port in a rear direction of the vehicle, the air introduction passage part being connected to the guide wall, and
an inner cowl is annexed to the front cowl from a side of the center of a vehicle body in order to form an intake passage space with respect to an engine, the inner cowl being formed integrally with the guide wall.

19. The saddle-ride vehicle according to claim 18, wherein a steering space for allowing steering of the front wheel suspension is formed in the inner cowl while surrounding the head pipe by an inner surface of the inner cowl,
the flow of air from the introduction port is introduced into the steering space along the guide wall, and
the introduced air is introduced to a rear side of a windshield mounted above the front cowl and to a front side of the handlebar.

* * * * *